(12) United States Patent
Bhogal et al.

(10) Patent No.: US 9,092,254 B2
(45) Date of Patent: *Jul. 28, 2015

(54) ENABLING MULTI-TENANCY FOR INTEGRATED DEVELOPMENT ENVIRONMENT SOFTWARE IN VIRTUAL ENVIRONMENTS

(75) Inventors: Navjot S. Bhogal, Bangalore (IN); Bhupesh Gupta, Bangalore (IN); Ashish Mungi, Bangalore (IN); Kapuveera R. Reddy, Bangalore (IN); Manjit S. Sodhi, Karnataka (IN); Ram Viswanathan, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 610 days.

This patent is subject to a terminal disclaimer.

(21) Appl. No.: 13/428,442

(22) Filed: Mar. 23, 2012

(65) Prior Publication Data
US 2013/0254764 A1    Sep. 26, 2013

(51) Int. Cl.
*G06F 9/455* (2006.01)
*G06F 9/46* (2006.01)

(52) U.S. Cl.
CPC ...................... *G06F 9/468* (2013.01)

(58) Field of Classification Search
CPC ...................................... G06F 9/468
See application file for complete search history.

(56) References Cited

U.S. PATENT DOCUMENTS

| | | | |
|---|---|---|---|
| 7,886,038 B2 | 2/2011 | Ferris | |
| 8,473,515 B2 | 6/2013 | Cotner et al. | |
| 8,631,333 B2 | 1/2014 | Cahill et al. | |
| 8,732,200 B2 | 5/2014 | Tootill | |
| 8,959,482 B2 | 2/2015 | Bhogal et al. | |
| 2008/0270459 A1 | 10/2008 | Grewal et al. | |
| 2009/0300423 A1 | 12/2009 | Ferris | |
| 2010/0005443 A1 | 1/2010 | Kwok et al. | |
| 2010/0023937 A1 | 1/2010 | Kothari et al. | |
| 2010/0077449 A1 | 3/2010 | Kwok et al. | |
| 2010/0125612 A1 | 5/2010 | Amradkar et al. | |

(Continued)

FOREIGN PATENT DOCUMENTS

WO    2011050482    5/2011

OTHER PUBLICATIONS

Azeez, et al.; Multi-Tenant SOA Middleware for Cloud Computing; 2010 IEEE 3rd International Conference on Cloud Computing; Jul. 5-10, 2010; pp. 458-465.

(Continued)

*Primary Examiner* — Abdullah Al Kawsar
*Assistant Examiner* — James J Lee
(74) *Attorney, Agent, or Firm* — Schmeiser, Olsen & Watts; John Pivnichny (57) ABSTRACT

A method and system for enabling multiple users in a computing environment is provided. The method includes receiving software comprising an operating system, integrated development environment (IDE) software, middleware software, and database software. A virtual image instance of operating system, the IDE software, the middleware software, and the database software is provisioned to a virtual instance. User IDs for access to the operating system instance are generated. Workspaces are generated and associated with the user IDs. The middleware software and the database software are configured and the virtual image instance is enabled to accept multiple concurrent logins associated with the user IDs.

5 Claims, 8 Drawing Sheets

(56) References Cited

U.S. PATENT DOCUMENTS

| | | | |
|---|---|---|---|
| 2010/0250608 A1 | 9/2010 | Malviya et al. | |
| 2011/0126168 A1 | 5/2011 | Ilyayev | |
| 2011/0131315 A1* | 6/2011 | Ferris et al. | 709/224 |
| 2011/0154441 A1 | 6/2011 | Oh et al. | |
| 2011/0173294 A1 | 7/2011 | Jackson | |
| 2011/0258620 A1 | 10/2011 | Gao et al. | |
| 2011/0276584 A1* | 11/2011 | Cotner et al. | 707/769 |
| 2012/0204126 A1* | 8/2012 | Yoshimura | 715/778 |
| 2013/0055243 A1* | 2/2013 | Dandekar et al. | 718/1 |
| 2013/0198718 A1 | 8/2013 | Kunze et al. | |
| 2013/0254764 A1 | 9/2013 | Bhogal et al. | |
| 2014/0059519 A1 | 2/2014 | Bhogal et al. | |

OTHER PUBLICATIONS

GeekInterview .com; Question asked by Kirankumar Samudraia on Feb. 23, 2011—What is Virtual Host? How will you configure Virtual Host in WebSphere?; Answer provided by Achyuth Ram published Apr. 1, 2011; retrieved from the Internet May 30, 2014; URL: .geekinterview.com/question_details/84651; 3 pages.

Office Action (Mail Date Jun. 11, 2014) for U.S. Appl. No. 13/590,572; Filing Date Aug. 21, 2012; Confirmation No. 6390.

Amendment filed Sep. 9, 2014 in Response to Office Action (Mail Date Jun. 11, 2014) for U.S. Appl. No. 13/590,572; Filing Date Aug. 21, 2012; Confirmation No. 6390.

Nicole Henderson, Jun. 8, 2011, Web Host Global Net Access Launches Multi-Tenant GNAX Cloud, 2 pages, URL: .the.thewhir.com/web-hosting-news060811 Web Host Global Net Access Launches Multi Tenant GNX Cloud.

Dionysios G. Synodinos, Cloud IDE for Java Launched by eXo, Mar. 17, 2011, 2 pages, URL: .infog.com/news/2011/03/cloud-ide-java-exo.

DIstinctive Cloud Technology Platform, 3 pages, URL: .successfactors.com/cloud/architecture/, Jul. 15, 2011.

VMware debuts Cloud Foundry, its open platform as a service, Apr. 14, 2011, Vision Solutions, 2 pages.

Sikander et al., A Prescriptive Architecture for Electronic Commerce and Digital Marketing, Microsoft, published Mar. 2010, Version 2.0, 95 pages.

Notice of Allowance (Mail Date Oct. 3, 2014) for U.S. Appl. No. 13/590,572; Filing Date Aug. 21, 2012; Confirmation No. 6390.

* cited by examiner

WAS Profiles

WebSphere Application Server local profile management:

| Installed Runtime Name | Installation Directory |
|---|---|
| ☐ Business Monitor Server v7.0... | C:\SDP_WTE\runtimes\bi_v7 |
| ☐ Process Server v7.0 | C:\SDP_WTE\runtimes\bi_v7 |
| ☐ ESB Server v7.0 | C:\SDP_WTE\runtimes\bi_v7 |
| | |
| | |
| | |
| | |

WebSphere Application Server profiles defined in the runtime selected above:

| Name | Location |
|---|---|
| AppSrv01 | C:\profiles\AppSrv01 |
| AppSrv02 | C:\profiles\AppSrv02 |
| AppSrv03 | C:\profiles\AppSrv03 |
| AppSrv04 | C:\profiles\AppSrv04 |
| AppSrv05 | C:\profiles\AppSrv05 |
| AppSrv06 | C:\profiles\AppSrv06 |
| AppSrv07 | C:\profiles\AppSrv07 |

ENABLING MULTI-TENANCY FOR INTEGRATED DEVELOPMENT ENVIRONMENT SOFTWARE IN VIRTUAL ENVIRONMENTS

FIELD

The present invention relates to a method and associated system for enabling multi-tenancy in virtual environments for a plurality of users.

BACKGROUND

Managing multiple users of a system typically comprises an inaccurate process with little flexibility. Allowing multiple users to access data within a system may include a complicated process that may be time consuming and require a large amount of resources. Accordingly, there exists a need in the art to overcome at least some of the deficiencies and limitations described herein above.

SUMMARY

The present invention provides method comprising: receiving, by a computing system comprising a computer processor, software comprising an operating system, integrated development environment (IDE) software, middleware software, and database software; provisioning, by the computer processor, a virtual image instance of the operating system, the IDE software, the middleware software, and the database software to a virtual instance; generating, by the computer processor, a plurality of user IDs for access to the operating system instance, wherein each user ID of the plurality of user IDs is associated with a different user of a plurality of users; configuring, by the computer processor, the IDE software, wherein the configuring the IDE software comprises generating workspaces; associating, by the computer processor, the workspaces with the user IDs; configuring, by the computer processor, the middleware software, wherein the configuring the middleware software comprises generating middleware profiles associated with the user IDs; configuring, by the computer processor, the database software, wherein the configuring the database software comprises generating virtual databases associated with the user IDs; and enabling, by the computer processor, the image instance to accept multiple concurrent logins associated with the user IDs.

The present invention provides computer program product, comprising a computer readable storage device storing a computer readable program code, the computer readable program code comprising an algorithm that when executed by a computer processor of a computer system implements a method, the method comprising: receiving, by the computing system, software comprising an operating system, integrated development environment (IDE) software, middleware software, and database software; provisioning, by the computer processor, a virtual image instance of said operating system, said IDE software, said middleware software, and said database software to a virtual instance; generating, by said computer processor, a plurality of user IDs for access to said operating system instance, wherein each user ID of said plurality of user IDs is associated with a different user of a plurality of users; configuring, by the computer processor, the IDE software, wherein the configuring the IDE software comprises generating workspaces; associating, by the computer processor, the workspaces with the user IDs; configuring, by the computer processor, the middleware software, wherein the configuring the middleware software comprises generating middleware profiles associated with the user IDs; configuring, by the computer processor, the database software, wherein the configuring the database software comprises generating virtual databases associated with the user IDs; and enabling, by the computer processor, the image instance to accept multiple concurrent logins associated with the user IDs.

The present invention provides computer system comprising a computer processor coupled to a computer-readable memory unit, the memory unit comprising instructions that when executed by the computer processor implements a method comprising: receiving, by the computing system, software comprising an operating system, integrated development environment (IDE) software, middleware software, and database software; provisioning, by the computer processor, a virtual image instance of the operating system, the IDE software, the middleware software, and the database software to a virtual instance; generating, by the computer processor, a plurality of user IDs for access to the operating system instance, wherein each user ID of the plurality of user IDs is associated with a different user of a plurality of users; configuring, by the computer processor, the IDE software, wherein the configuring the IDE software comprises generating workspaces; associating, by the computer processor, the workspaces with the user IDs; configuring, by the computer processor, the middleware software, wherein the configuring the middleware software comprises generating middleware profiles associated with the user IDs; configuring, by the computer processor, the database software, wherein the configuring the database software comprises generating virtual databases associated with the user IDs; and enabling, by the computer processor, the image instance to accept multiple concurrent logins associated with the user IDs.

The present invention provides process for supporting computing infrastructure, the process comprising providing at least one support service for at least one of creating, integrating, hosting, maintaining, and deploying computer-readable code in a computer comprising a processor, wherein the processor carries out instructions contained in the code causing the computer to perform a method comprising the steps of: receiving, by the computing system, software comprising an operating system, integrated development environment (IDE) software, middleware software, and database software; provisioning, by the computer processor, a virtual image instance of the operating system, the IDE software, the middleware software, and the database software to a virtual instance; generating, by the computer processor, a plurality of user IDs for access to the operating system instance, wherein each user ID of the plurality of user IDs is associated with a different user of a plurality of users; configuring, by the computer processor, the IDE software, wherein the configuring the IDE software comprises generating workspaces; associating, by the computer processor, the workspaces with the user IDs; configuring, by the computer processor, the middleware software, wherein the configuring the middleware software comprises generating middleware profiles associated with the user IDs; configuring, by the computer processor, the database software, wherein the configuring the database software comprises generating virtual databases associated with the user IDs; and enabling, by the computer processor, the image instance to accept multiple concurrent logins associated with the user IDs.

The present invention advantageously provides a simple method and associated system capable of managing multiple users of a system.

DETAILED DESCRIPTION

Figure 1:
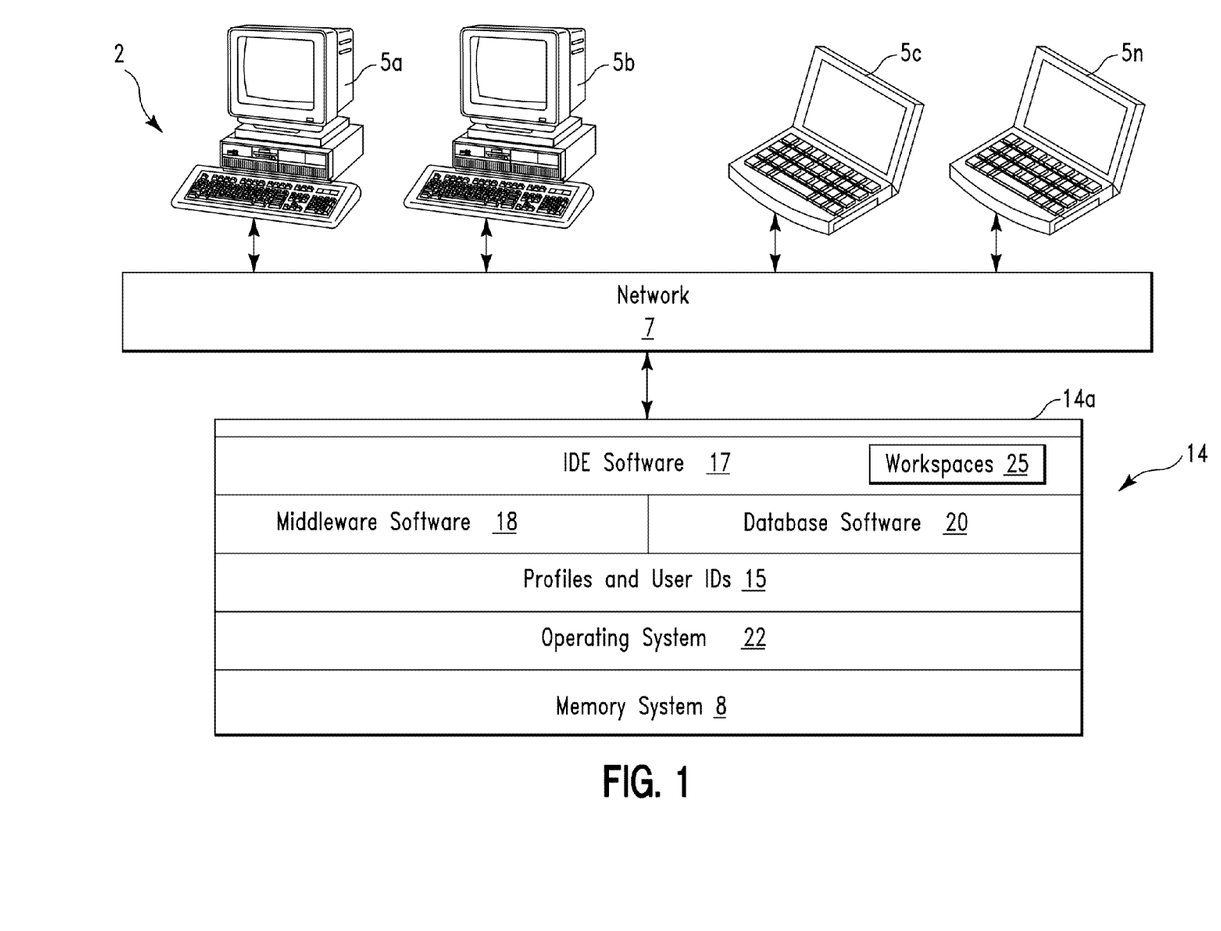
FIG. 1 illustrates a system for enabling integrated development environments (IDEs) to become multi-tenant, in accordance with embodiments of the present invention.

FIG. 1 illustrates a system 2 for enabling integrated development environments (IDEs) to become multi-tenant, in accordance with embodiments of the present invention. Multi-tenancy is defined herein as a software architecture that includes a single instance of software running on a server and serving multiple client organizations (i.e., tenants). In a multi-tenant environment, multiple customers share a same application running on a same operating system, hardware, and data-storage mechanism.

System 2 of FIG. 1 comprises computer terminals 5a...5n through a network 7 to a computing system 14. Network 7 may comprise any type of network including, inter alia, a local area network, (LAN), a wide area network (WAN), the Internet, a wireless network, etc. Computing system 14 and computer terminals 5a...5n may comprise any type of computing system(s) including, inter alia, a computer (PC), a laptop computer, a server, a PDA, etc. Computing system 14 comprises a virtual instance 14a comprising a memory system 8, IDE software 17 comprising work spaces 25, database software 20, middleware software 18, operating systems 22, and user IDs and profiles 15.

Virtual instance 14a enables multiple customers to share a same application running on a same operating system and hardware with a same data-storage mechanism. System 2 enables multi-tenancy in a developer/test/training environment using IDE software 17 in combination with middleware software 18. Middleware software 18 may include, inter alia, application servers and business process management servers that support a creation of multiple server instances on a same installation. The server instances may be created as profiles (e.g., profiles 15) with different configurations, features, and deployment characteristics. Each profile or server instance acts as a stand-alone server and supports an installation of applications as described in the following examples:

Example 1

An application server supports multiple profiles to be created. Each profile comprises a server instance. The application server supports profiles to be created on multiple nodes and therefore a central deployment manager profile may support multiple stand-alone server profiles on multiple nodes.

Example 2

A process server supports multiple profiles to be created. Each profile comprises a process server instance. The profiles may be augmented as enterprise service bus profiles thereby enabling the use of process server profiles or enterprise service bus profiles as business process management servers, standalone server profiles, and/or on multiple nodes.

System 2 allows databases (i.e., using database software 20) to be created, provisioned, and associated with each application server profile. The databases are created through logical partitioning (i.e., table spaces or schemas with appropriate permissions for specific users or user groups) or physical partitioning (i.e., separate databases with appropriate permissions for specific users or user groups). System 2 enables the following process for enabling IDEs to become multi-tenant:

1. An image instance is provisioned with an operating system (e.g., of operating systems 22) in a virtual environment. The operating system is associated with system requirements for IDE software 17 and middleware software 18.
2. IDE software 17 is installed such that it may be accessed by multiple users.
3. Middleware software 18 is installed on the same image instance or different image instances in the virtual environment. Middleware software 18 may be installed as an independent installation or as a test environment configuration associated with IDE software 17.
4. Database software 20 is installed on the same image instance or different image instances in the virtual environment.
5. User IDs (associated with multiple users) and associated privileges are generated for the operating system.
6. IDE software 17 is configured by:
   A. Creating one or more workspaces 25 for each user ID and mapping the user IDs to the workspace(s).
   B. Configuring permissions such that workspaces are only available/visible to the authorized user IDs
   C. Configuring the workspaces such that only one user ID may access a workspace at any given time.
7. Multiple profiles (i.e., server instances) are generated for the middleware. The profiles are configured such that there is one or more profiles for each user ID. The profiles may be created on a same image instance or on multiple image instances.
8. The middleware profiles are associated/mapped with corresponding user IDs by configuring permissions for users (at directory level in the operating system or through the security configuration for each middleware profile). The association/mapping process will ensure that each user will have their own middleware environment and there is no conflict with any other concurrently logged-in user.
9. Databases are created or provisioned using either logical partitioning (i.e., table spaces or schemas with appropriate permissions for specific users or user groups) or physical partitioning (i.e., separate databases with appropriate permissions for specific users or user groups).
10. The databases are associated or mapped with each middleware server profile using data sources. The data sources are assigned appropriate permissions to the databases so that only specific user IDs may access data in the databases. The aforementioned process enables a given user ID to be associated or/mapped with specific workspaces, specific middleware profiles, and specific data sources/databases in a virtual environment. Therefore, when a user logs into a developer virtual environment, they will be able to access their own developer stack (i.e., IDE/middleware/database)
11. The image instance(s) is enabled for multiple logins by applying an appropriate license in the virtual environment. This will allow multiple users to login concurrently to their respective IDEs.

Figure 2:
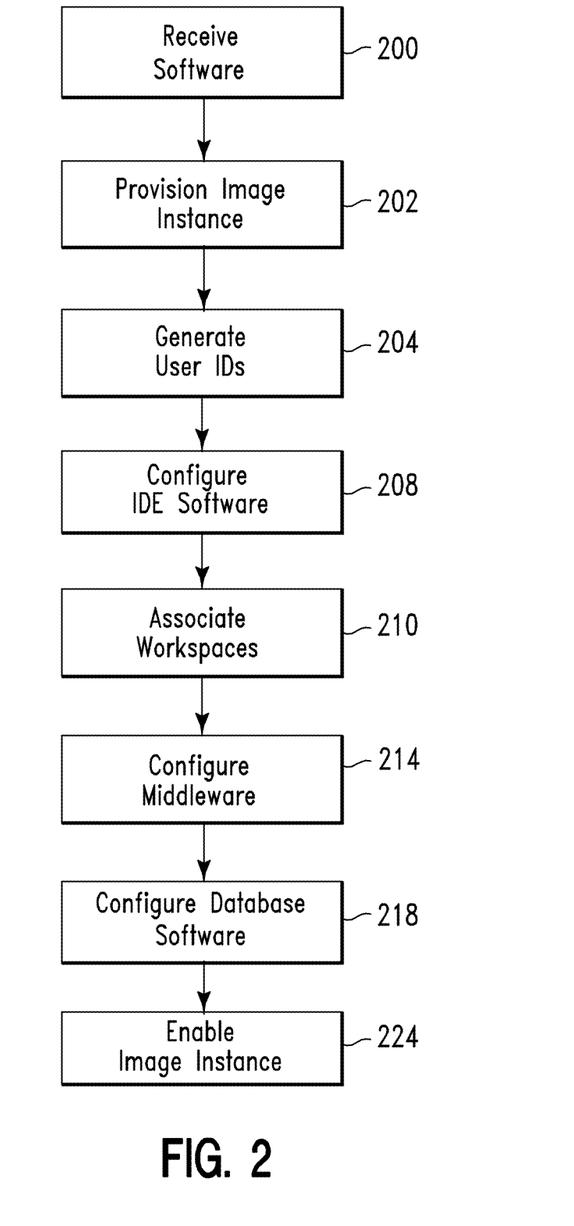
FIG. 2 illustrates an algorithm detailing a process flow enabled by the system of FIG. 1 for enabling IDEs to become multi-tenant, in accordance with embodiments of the present invention.

FIG. 2 illustrates an algorithm detailing a process flow enabled by system 2 of FIG. 1 for enabling IDEs to become multi-tenant, in accordance with embodiments of the present invention. In step 200, a computing system comprising a computer processor (e.g., computing system 14 comprising virtual instance 14a in FIG. 1) receives operating system software, IDE software, middleware software, and database software. In step 202, the computer processor provisions a virtual image instance of the operating system software, the IDE software, the middleware software, and the database software to a virtual instance. In step 204, the computer processor generates user IDs for access to the operating system instance. In step 208 the computer processor configures the IDE software. The IDE software configuration process includes:

1. Generating workspaces.
2. Mapping the user IDs to the workspaces such that each user ID is associated with at least one workspace.
3. Configuring permissions associated with accessing the workspaces.

In step 210, the computer processor associates the workspaces with the user IDs. In step 214, the computer processor configures the middleware software. The middleware software configuration process includes:

1. Generating middleware profiles (e.g., virtual server instances) associated with the user IDs.
2. Mapping the user IDs to the middleware profiles.
3. Configuring user specific permissions for each profile.

In step 218, the computer processor configures the database software. The database software configuration process includes:

1. Generating virtual databases associated with the user IDs.
2. Mapping the user IDs to the virtual databases through the user specific permissions.
3. Generating data sources associated with the virtual databases.
4. Assigning said user specific permissions to the data sources.
5. Mapping the virtual databases to the middleware profiles through the data sources.

In step 224, the computer processor enables the image instance to accept multiple concurrent logins associated with the user IDs.

Figure 3A:
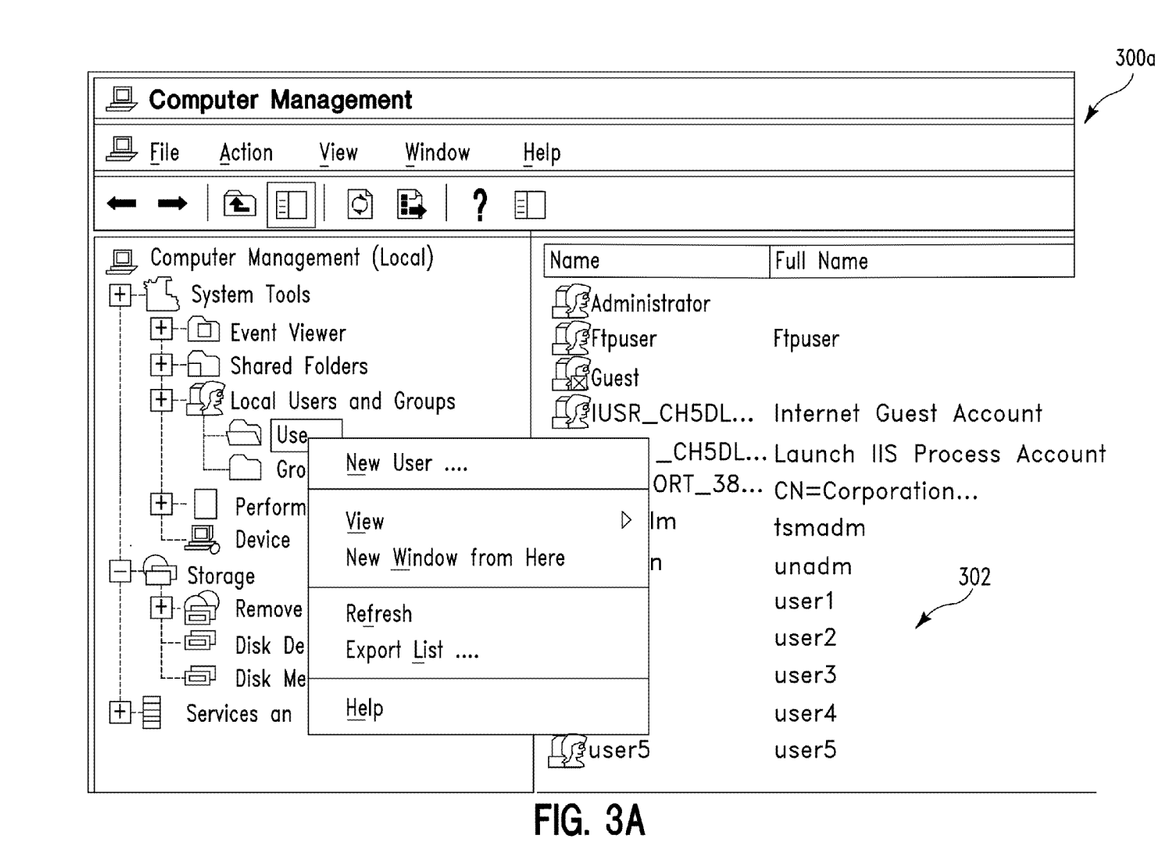
FIGS. 3A-3F illustrate screen shot examples for implementing a process for enabling IDEs to become multi-tenant, in accordance with embodiments of the present invention.

FIG. 3A illustrates a screen shot 300a for generating user IDs 302 for users, in accordance with embodiments of the present invention.

Figure 3B:
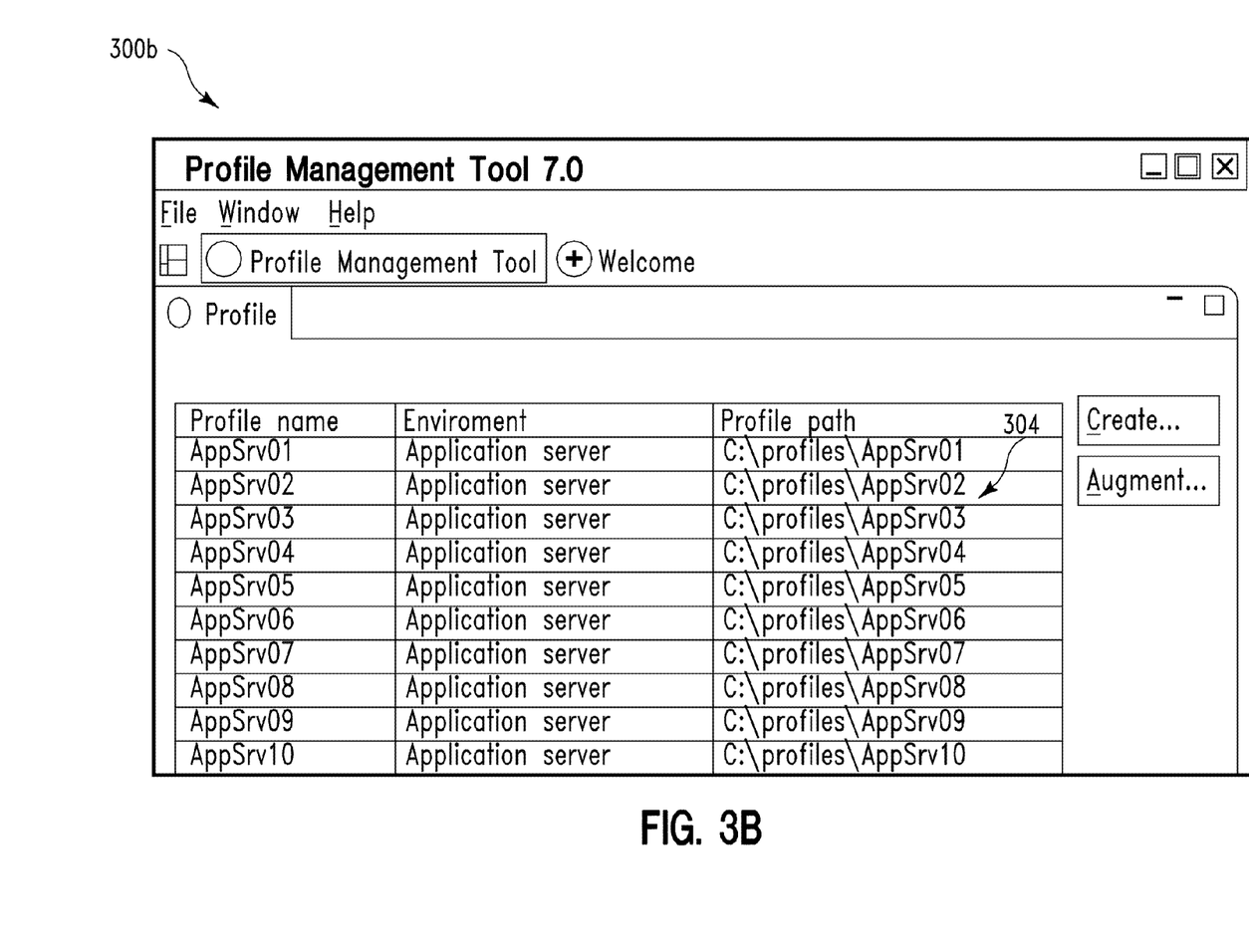

FIG. 3B illustrates a screen shot 300b for selecting default options for middleware profiles, in accordance with embodiments of the present invention. The default options ensure that there are no port conflicts among generated middleware profiles 304.

Figure 3C:
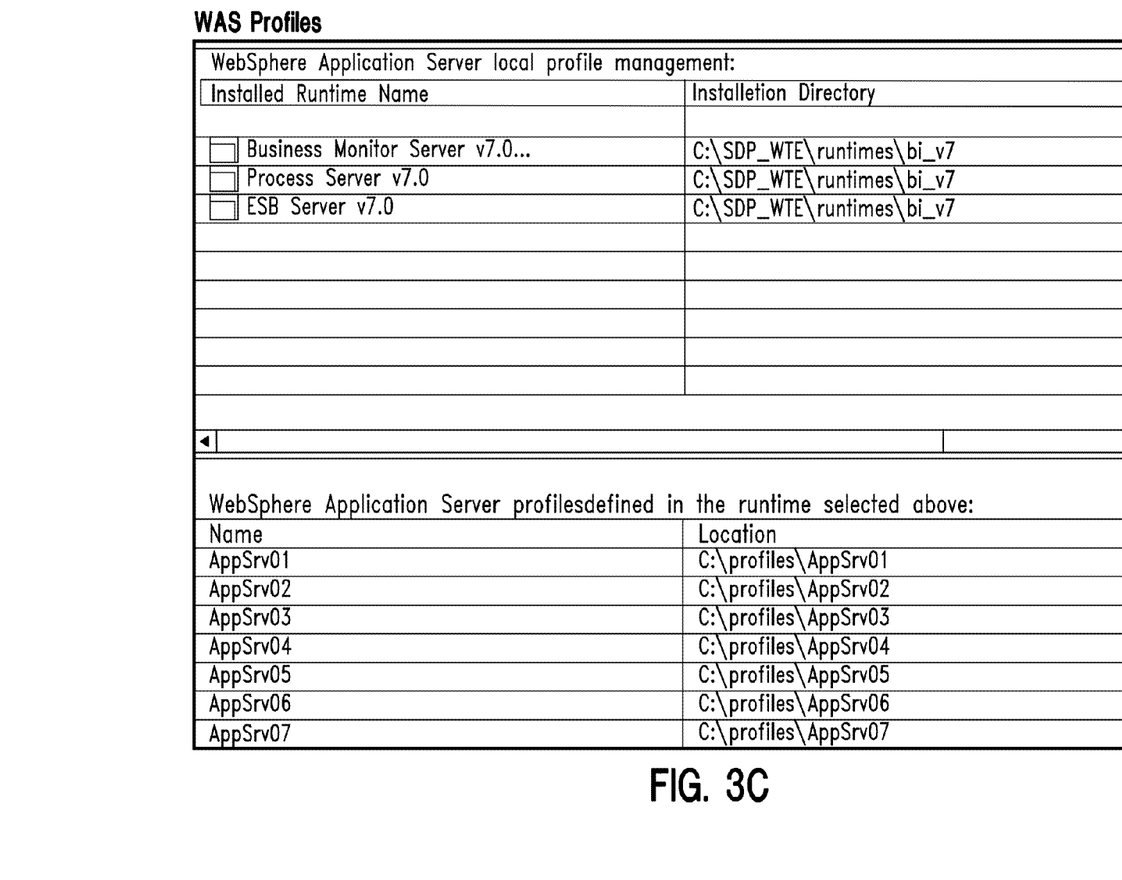

FIG. 3C illustrates a screen shot 300c comprising entries with respect to servers associated with the middleware profiles, in accordance with embodiments of the present invention.

Figure 3D:
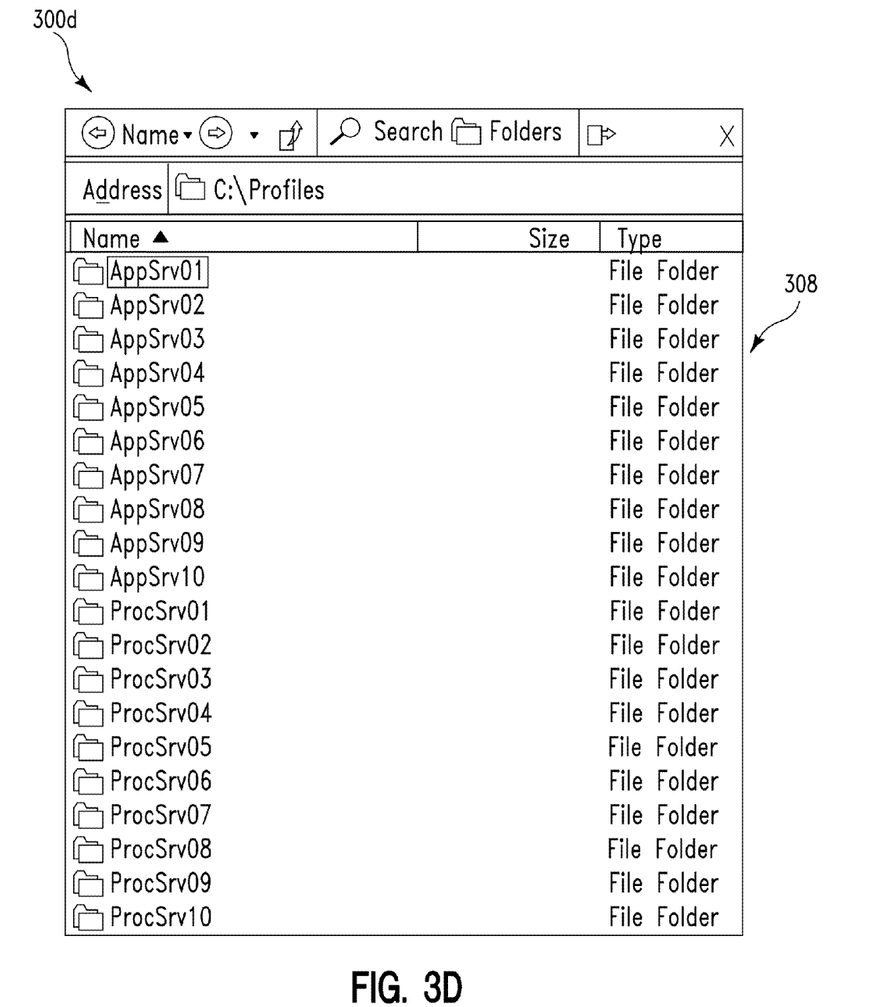

FIG. 3D illustrates a screen shot 300d for the middleware profile folders 308, in accordance with embodiments of the present invention.

Figure 3E:
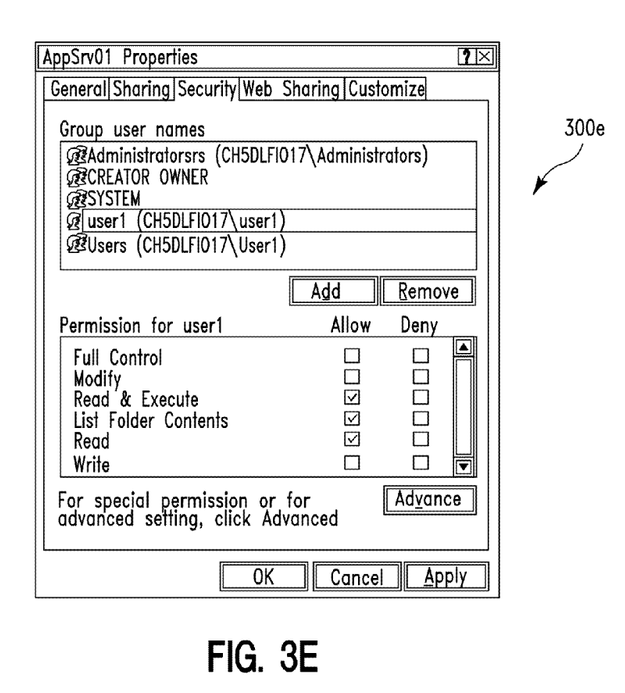

FIG. 3E illustrates a screen shot 300e for setting access rights for the user IDs associated with the respective middleware profiles, in accordance with embodiments of the present invention. Screenshot 300e illustrates the specific example of setting access permissions for the folder "AppSrv01" for the user ID "user1". Folder "AppSrv01" is associated with middleware profile AppSrv01 as per FIG. 3D.

Figure 3F:
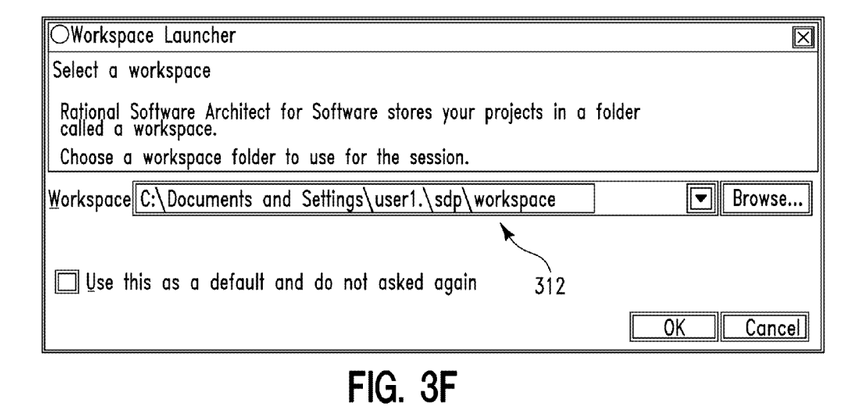

FIG. 3F illustrates a screen shot 300f for selecting a specified workspace 312 associated with a user ID "user1", in accordance with embodiments of the present invention.

Figure 4:
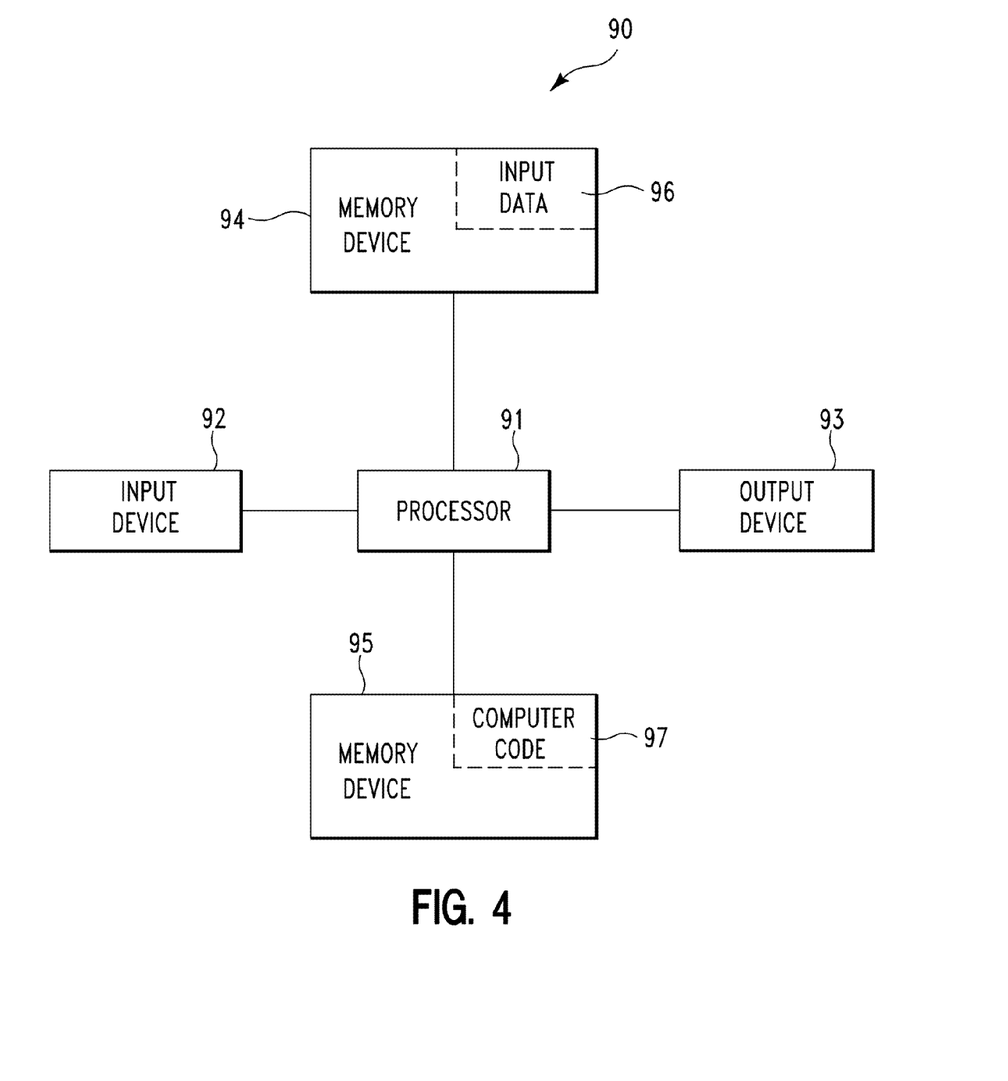
FIG. 4 illustrates a computer apparatus used by the system of FIG. 1 for enabling IDEs to become multi-tenant, in accordance with embodiments of the present invention.

FIG. 4 illustrates a computer apparatus 90 used by system 2 of FIG. 1 for enabling IDEs to become multi-tenant, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling IDEs to become multi-tenant. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to enable IDEs to become multi-tenant. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method enable IDEs to become multi-tenant. In another embodiment, the invention provides a business method that performs the process steps of the invention on a subscription, advertising, and/or fee basis. That is, a service supplier, such as a Solution Integrator, could offer to for enable IDEs to become multi-tenant. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method for enabling multi-tenancy in integrated development environment, the method comprising:

receiving, by a computing system comprising a computer processor, software comprising an operating system, integrated development environment (IDE) software, middleware software, and database software;

provisioning, by said computer processor, a virtual instance with an instance of said operating system, said IDE software, said middleware software, and said database software;

generating, by said computer processor, a plurality of user IDs for access to said operating system instance, wherein each user ID of said plurality of user IDs is associated with a different user of a plurality of users;

configuring, by said computer processor, said IDE software instance, wherein said configuring said IDE software instance comprises:

generating workspaces;

mapping said plurality of user IDs to said workspaces such that each said user ID is associated with at least one workspace of said workspaces;

configuring permissions associated with accessing said workspaces;

configuring, by said computer processor, said middleware software instance, wherein said configuring said middleware software instance comprises:

generating middleware profiles associated with said user IDs, wherein said computer processor provides an interface for selecting default options associated with middleware profiles, wherein said default options ensure that there are no port conflicts among the generated middleware profiles;

mapping said user IDs to said middleware profiles, wherein each of said middleware profiles comprises a virtual server instance that supports installation of applications for users associated with said user IDs;

configuring user specific permissions for each middleware profile of said middleware profiles;

configuring, by said computer processor, said database software, wherein said configuring said database software comprises:

generating virtual databases associated with said user IDs;

mapping said plurality of user IDs to said virtual databases through said user specific permissions;

generating data sources associated with said virtual databases;

assigning said user specific permissions to said data sources;

mapping said virtual databases to said middleware profiles through said data sources to ensure only specific user IDs access data in the virtual databases; and enabling, by said computer processor, said virtual instance to accept multiple concurrent logins associated with said plurality of user IDs and provide access to their own developer stack comprising IDE, middleware and database.

2. A computer program product, comprising a computer memory storing a computer readable program code, said computer readable program code comprising an algorithm that when executed by a computer processor of a computer system implements a method for enabling multi-tenancy in integrated development environment, said method comprising:

receiving, by said computing system, software comprising an operating system, integrated development environment (IDE) software, middleware software, and database software;

provisioning, by said computer processor, a virtual instance with an instance of said operating system, said IDE software, said middleware software, and said database software;

generating, by said computer processor, a plurality of user IDs for access to said operating system instance, wherein each user ID of said plurality of user IDs is associated with a different user of a plurality of users;

configuring, by said computer processor, said IDE software instance, wherein said configuring said IDE software instance comprises:

generating workspaces;

mapping said plurality of user IDs to said workspaces such that each said user ID is associated with at least one workspace of said workspaces;

configuring permissions associated with accessing said workspaces;

configuring, by said computer processor, said middleware software instance, wherein said configuring said middleware software instance comprises:

generating middleware profiles associated with said user IDs, wherein said computer processor provides an interface for selecting default options associated with middleware profiles, wherein said default options ensure that there are no port conflicts among the generated middleware profiles;

mapping said user IDs to said middleware profiles, wherein each of said middleware profiles comprises a virtual server instance that supports installation of applications for users associated with said user IDs;

configuring user specific permissions for each middleware profile of said middleware profiles;

configuring, by said computer processor, said database software, wherein said configuring said database software comprises:

generating virtual databases associated with said user IDs;

mapping said plurality of user IDs to said virtual databases through said user specific permissions;

generating data sources associated with said virtual databases;

assigning said user specific permissions to said data sources;

mapping said virtual databases to said middleware profiles through said data sources to ensure only specific user IDs access data in the virtual databases; and enabling, by said computer processor, said virtual instance to accept multiple concurrent logins associated with said plurality of user IDs and provide access to their own developer stack comprising IDE, middleware and database.

3. A computer system comprising a computer processor coupled to a computer-readable memory unit, said memory unit comprising instructions that when executed by the computer processor implements a method for enabling multi-tenancy in integrated development environment, the method comprising:

receiving, by a computing system comprising a computer processor, software comprising an operating system, integrated development environment (IDE) software, middleware software, and database software;

provisioning, by said computer processor, a virtual instance with an instance of said operating system, said IDE software, said middleware software, and said database software;
generating, by said computer processor, a plurality of user IDs for access to said operating system instance, wherein each user ID of said plurality of user IDs is associated with a different user of a plurality of users;
configuring, by said computer processor, said IDE software instance, wherein said configuring said IDE software instance comprises:
  generating workspaces;
  mapping said plurality of user IDs to said workspaces such that each said user ID is associated with at least one workspace of said workspaces;
  configuring permissions associated with accessing said workspaces;
configuring, by said computer processor, said middleware software instance, wherein said configuring said middleware software instance comprises:
  generating middleware profiles associated with said user IDs, wherein said computer processor provides an interface for selecting default options associated with middleware profiles, wherein said default options ensure that there are no port conflicts among the generated middleware profiles;
  mapping said user IDs to said middleware profiles, wherein each of said middleware profiles comprises a virtual server instance that supports installation of applications for users associated with said user IDs;
  configuring user specific permissions for each middleware profile of said middleware profiles;
configuring, by said computer processor, said database software, wherein said configuring said database software comprises:
  generating virtual databases associated with said user IDs;
  mapping said plurality of user IDs to said virtual databases through said user specific permissions;
  generating data sources associated with said virtual databases;
  assigning said user specific permissions to said data sources;
  mapping said virtual databases to said middleware profiles through said data sources to ensure only specific user IDs access data in the virtual databases; and
enabling, by said computer processor, said virtual instance to accept multiple concurrent logins associated with said plurality of user IDs and provide access to their own developer stack comprising IDE, middleware and database.

4. A process for supporting computing infrastructure, the process comprising providing at least one support service for at least one of creating, integrating, hosting, maintaining, and deploying computer-readable code in a computer comprising a processor, wherein the processor carries out instructions contained in the code causing the computer to perform a method for enabling multi-tenancy in integrated development environment, the method comprising the steps of:
receiving, by a computing system comprising a computer processor, software comprising an operating system, integrated development environment (IDE) software, middleware software, and database software;
provisioning, by said computer processor, a virtual instance with an instance of said operating system, said IDE software, said middleware software, and said database software;
generating, by said computer processor, a plurality of user IDs for access to said operating system instance, wherein each user ID of said plurality of user IDs is associated with a different user of a plurality of users;
configuring, by said computer processor, said IDE software instance, wherein said configuring said IDE software instance comprises:
  generating workspaces;
  mapping said plurality of user IDs to said workspaces such that each said user ID is associated with at least one workspace of said workspaces;
  configuring permissions associated with accessing said workspaces;
configuring, by said computer processor, said middleware software instance, wherein said configuring said middleware software instance comprises:
  generating middleware profiles associated with said user IDs, wherein said computer processor provides an interface for selecting default options associated with middleware profiles, wherein said default options ensure that there are no port conflicts among the generated middleware profiles;
  mapping said user IDs to said middleware profiles, wherein each of said middleware profiles comprises a virtual server instance that supports installation of applications for users associated with said user IDs;
  configuring user specific permissions for each middleware profile of said middleware profiles;
configuring, by said computer processor, said database software, wherein said configuring said database software comprises:
  generating virtual databases associated with said user IDs;
  mapping said plurality of user IDs to said virtual databases through said user specific permissions;
  generating data sources associated with said virtual databases;
  assigning said user specific permissions to said data sources;
  mapping said virtual databases to said middleware profiles through said data sources to ensure only specific user IDs access data in the virtual databases; and
enabling, by said computer processor, said virtual instance to accept multiple concurrent logins associated with said plurality of user IDs and provide access to their own developer stack comprising IDE, middleware and database.

5. The method of claim 1, further comprising:
generating and presenting, by said computer processor, an additional interface associated with selecting access rights for said plurality of user IDs associated with said middleware profiles.

* * * * *